United States Patent
Maruyama et al.

[11] Patent Number: 5,838,496
[45] Date of Patent: Nov. 17, 1998

[54] DIFFRACTIVE MULTI-FOCAL OBJECTIVE LENS

[75] Inventors: Koichi Maruyama; Junji Kamikubo, both of Tokyo, Japan

[73] Assignee: Asahi Kogaku Kogyo Kabushiki Kaisha, Tokyo, Japan

[21] Appl. No.: 703,660

[22] Filed: Aug. 27, 1996

[30] Foreign Application Priority Data

Aug. 28, 1995  [JP]  Japan .................................. 7-242466

[51] Int. Cl.$^6$ ............................. G02B 27/44; G02B 5/18
[52] U.S. Cl. ........................................... 359/565; 359/569
[58] Field of Search .................... 359/565, 569, 359/558

[56] References Cited

U.S. PATENT DOCUMENTS

| | | | |
|---|---|---|---|
| 4,995,714 | 2/1991 | Cohen | 359/565 |
| 5,054,905 | 10/1991 | Cohen | 359/569 |
| 5,100,226 | 3/1992 | Freeman | 351/160 R |
| 5,229,797 | 7/1993 | Futhey et al. | 359/565 |
| 5,344,447 | 9/1994 | Swanson | 359/565 |
| 5,384,606 | 1/1995 | Koch et al. | 351/158 |
| 5,446,565 | 8/1995 | Komma et al. | 359/19 |
| 5,526,338 | 6/1996 | Hasman et al. | 369/109 |
| 5,629,799 | 5/1997 | Maruyama et al. | 359/565 |

FOREIGN PATENT DOCUMENTS

| | | | |
|---|---|---|---|
| 6-242373 | 9/1994 | Japan | G02B 13/18 |
| 7-98431 | 4/1995 | Japan | G02B 13/00 |

*Primary Examiner*—Jon W. Henry
*Assistant Examiner*—John Juba, Jr.
*Attorney, Agent, or Firm*—Greenblum & Bernstein, P.L.C.

[57] ABSTRACT

A diffractive multi-focal objective lens formed, macroscopically, as a double convex lens having convex aspherical surfaces of which radii of curvatures are larger as a function of distance from the optical axis. One lens surface is provided with a microscopic diffractive lens construction that is formed as ring zones concentric about the optical axis. The diffractive lens construction is designed so that the higher the diffractive order, the shorter the focal length. For example, a first order diffractive light beam forms a first focal point F1 on the optical axis, and a second order diffractive light beam forms a second focal point F2 on the optical axis that is nearer to the lens than the first focal point F1.

8 Claims, 1 Drawing Sheet

FIG. 1(A)  FIG. 1(B)  FIG. 1(C)
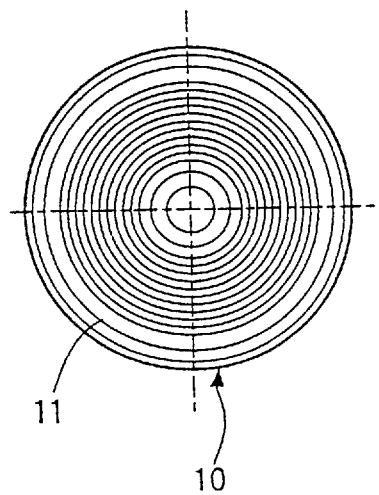
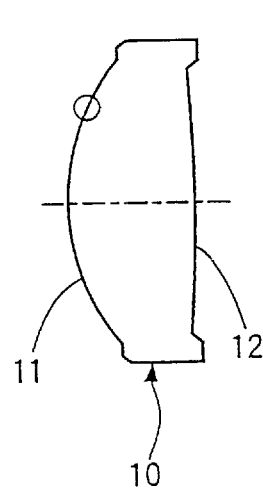
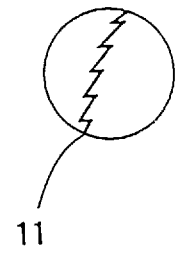
FIG. 2
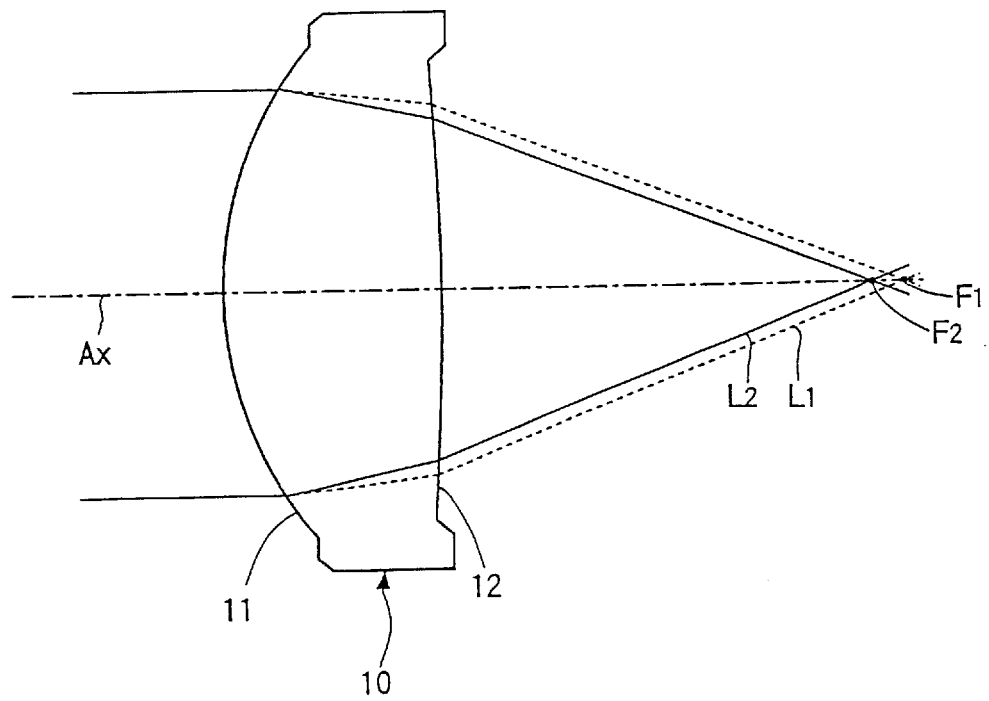

DIFFRACTIVE MULTI-FOCAL OBJECTIVE LENS

BACKGROUND OF THE INVENTION

The present invention relates to a diffractive multi-focal objective lens. The diffractive multi-focal objective lens is used, for example, as an objective lens in an optical read-only head or an optical read/write head, which has been designed to read from or write to a variety of optical disks having different thicknesses, cover-layer refractive indexes and the like.

A conventional multi-focal objective lens is designed to have two focal points so that data can be read from two different kinds of disks, for example, having different cover layer thicknesses, using only one optical read-only head. The conventional multi-focal objective lens (in this case a bifocal lens) comprises an aspherical glass lens having positive power on which a hologram lens configuration having a negative power is formed. The hologram lens configuration is formed on a center portion of one lens surface of the aspherical glass lens.

A light beam incident on the central hologram lens configuration is divided into a zero order diffractive light beam and a first order diffractive light beam. A combination of the zero order diffractive light beam and the light beam transmitted through the portion of the lens where the hologram lens configuration is not applied converge on a first focal point. The first order diffractive light beam converges on a second focal point. The second focal point is positioned further away from the lens than the first focal point, and both the first focal point and the second focal point are on an optical axis of the lens.

However, the conventional multi-focal lens functions as a single piece lens with respect to the light beams converging at the first focal point. As such, chromatic aberration occurs and, therefore, if the wavelength of the incident light changes, the position of the first focal point along the optical axis changes.

Also, the conventional multi-focal lens functions as a combination of a positive glass lens and a negative hologram lens with respect to the light beams converging at the second focal point. Again, chromatic aberration occurs, such that if the wavelength of the incident light changes, the positive power of the positive glass lens tends to change the position of the focal point in one direction along the optical axis. Also, the negative power of the negative hologram lens tends to change the focal point in the same direction. Thus, the combination of the positive glass lens and the negative hologram lens produces a larger amount of chromatic aberration. That is, if the wavelength of the incident light changes, the position of the second focal point along the optical axis changes by a greater amount than for a standard positive glass lens.

This chromatic aberration problem is more serious in a read/write head because the power of the semiconductor laser is varied to provide enough power during writing, such that reading and writing occur at different powers, and therefore at different wavelengths, thus causing a large change in the position of the second focal point due to chromatic aberration. If the chromatic aberration is not corrected for, this large change in the second focal point can cause reading errors or writing errors.

SUMMARY OF THE INVENTION

It is therefore an object of the present invention to provide an improved diffractive multi-focal objective lens that produces at least two distinct focal points and that compensates for a chromatic aberration.

The diffractive multi-focal objective lens according to the present invention includes refracting means for refracting an incident light beam to converge the incident light beam, and diffracting means for diffracting the incident light beam to divide the incident light beam into a plurality of diffractive light beams.

The refracting means includes a single-piece positive lens.

The diffracting means includes a microscopic diffractive lens construction formed on a lens surface of the single-piece positive lens.

The refracting means and the diffracting means operate together, such that the incident light beam is divided into a plurality of diffracted light beams which are converged at a plurality of focal points on the optical axis of the diffractive multi-focal objective lens.

The diffractive multi-focal objective lens structure is such that a predetermined amount of the light intensity of the incident light beam is distributed to two light beams with distinct diffractive orders. The two light beams converge, respectively, at two of the plurality of focal points such that the focal point for a higher diffractive order diffractive light beam is closer to the lens than a focal point for a lower diffractive order diffractive light beam.

The diffractive lens construction is formed as ring zones concentric to the optical axis. A phase difference $\Delta\phi$ applied at each boundary of adjacent zones for a predetermined wavelength $\lambda$ satisfies the following condition (1):

$$1.0\lambda < \Delta\phi < 2.0\lambda \tag{1}$$

Further, in the case that the light distributed to the first focal point is used for only reading of optical data and the light distributed to the second focal point is used for both writing and reading of optical data, a light distribution balance preferably satisfies the following condition (2):

$$0.21 < P1/P2 < 0.76 \tag{2}$$

where P1 and P2 represent the light intensity distributed to the first and second focal points, respectively.

A surface configuration SAG of the diffractive lens construction is expressed by the following sagitta equation (3):

$$SAG = \alpha * SAG0 + (1-\alpha) * SAG1 \tag{3}$$

where SAG0 represents a surface configuration blazed to produce a predetermined order diffractive light beam with 100% diffractive efficiency at the first focal point, and SAG1 represents a surface configuration blazed to produce a second predetermined order diffractive light beam with 100% diffractive efficiency at the second focal point.

The coefficient $\alpha$ in the equation (3) must satisfy the following condition (4):

$$0 < \alpha < 1 \tag{4}$$

In the case that the light distributed to the first focal point is used for only reading of optical data and the light distributed to the second focal point is used for both writing and reading of optical data, the coefficient $\alpha$ preferably satisfies the following condition (5):

$$0.31 \leq \alpha \leq 0.46 \tag{5}$$

BRIEF DESCRIPTION OF THE DRAWINGS

FIG. 1 shows a diffractive multi-focal objective lens according to the invention, in which FIG. 1(A) is a front view, FIG. 1(B) is a side view and FIG. 1(C) is an enlarged side view; and FIG. 2 shows a light beam passing through the diffractive multi-focal objective lens according to the invention.

DETAILED DESCRIPTION OF THE PREFERRED EMBODIMENTS

In the following embodiment, a diffractive multi-focal objective lens according to the invention is described as it is applied to an optical read/write head for an optical disk device, such as, for example, a CD player. In particular, the lens of the embodiment uses two focal points and is therefore a diffractive bifocal objective lens.

FIG. 1 shows a diffractive bifocal objective lens (lens 10) according to the invention. FIG. 1(A) is a front view, FIG. 1(B) is a side view and FIG. 1(C) is an enlarged side view.

At the macroscopic level, the lens 10 is a double convex single lens. The lens 10 includes lens surfaces 11 and 12, both of which are aspherical surfaces with radii of curvature that become larger with increasing distance from a center toward a periphery. A microscopic diffractive lens construction is formed on the lens surface 11 as a series of concentric ring zones with centers on the optical axis.

Each ring zone forms an annular aspherical surface and each ring zone is separated from an adjacent ring zone by a step parallel to the optical axis. The steps are formed by a process known as blazing and the step size determines the order of diffractive light that will be formed by the lens. To produce a particular order of diffractive light at 100% diffraction efficiency, the step size (along the optical axis) is determined by the wavelength of the incident light and is calculated to produce a phase difference $\Delta\phi$ in the incident light wave that, for zero order diffractive light is equal to 0, for first order diffractive light is equal to $1\lambda$, for second order diffractive light is $2\lambda$, and so on.

In this specification, the function of the diffractive lens construction is defined as the diffractive lens function (diffracting means), and the function of the lens at the macroscopic level, excluding the diffractive lens function, is defined as the refractive lens function (refracting means).

The refractive lens function is equal to that of a positive lens used to converge an incident light beam The diffractive lens function diffracts the incident light beam to divide it into a plurality of diffractive light beams of different diffractive orders. The diffractive lens function also includes a positive power function to converge the diffractive light beams that have diffractive orders greater than or equal to first order. This is different from the conventional holographic lens construction which is a negative lens construction. In this way, the higher the diffractive order is, the shorter the focal length. A predetermined amount (a high percentage) of the light intensity of the incident light beam is distributed to two of a plurality of focal points.

Due to chromatic aberration, changes in the wavelength of the incident light causes the position of the focal points of each of the refractive lens function and the diffractive lens function to change along the optical axis. For the diffractive lens function acting alone, the positive power causes the position of the focal point to tend to change in one direction along the optical axis. That is, for shorter wavelengths, the focal point moves away from the lens. For the refractive lens function acting alone, the position of the focal point tends to change in the opposite direction. That is, for shorter wavelengths, the focal point moves toward the lens.

Therefore, when the diffractive lens function and the refractive lens function are combined, any change in the position of the focal point due to a change in wavelength is counterbalanced. The counterbalancing occurs only for diffractive light beams with diffractive order greater than or equal to first order since the diffractive lens function has positive power only for diffractive light beams with diffractive order greater than or equal to first order. As a result of this, the variation of the focal point (for higher diffraction order light beams) due to wavelength changes, i.e. chromatic aberration, can be reduced.

In one aspect of the embodiment, a lens 10 is formed such that the two focal points are converged by a zero order diffractive light beam and some other order diffractive light beam. Since the zero order diffractive light beam is not affected by the diffractive lens function, the chromatic aberration is not corrected. However, the total chromatic aberration of the lens 10 can be reduced as compared to the conventional diffractive multi-focal objective lens (having a negative hologram lens construction) because the chromatic aberration can be corrected for the other order diffractive light beam. In the conventional diffractive multi-focal objective lens, the chromatic aberration of the first order diffractive light beam is, in fact, larger than that of the zero order diffractive light beam.

In a second aspect of the embodiment, a lens 10 is formed such that the two focal points are formed by two diffractive light beams, each of which has a different diffractive order greater than zero. In this way, the chromatic aberration for each order of diffractive light beam can be corrected.

However, it is impossible to perfectly correct the chromatic aberration in a plurality of diffractive orders since the positive power of the refractive lens function is constant for all orders of diffractive light beam, but the positive power of the diffractive lens function varies in accordance with the diffractive order.

Thus, for example, when the first and second order diffractive light beams are used to form the focal points, the chromatic aberration may be corrected by 2/3 for the first order diffractive light beam and by 4/3 for the second order diffractive light beam. In this case, even though the first order diffractive light beam is under-corrected and the second order diffractive light beam is over-corrected, the overall chromatic aberration can be reduced by 1/3 as compared with a refractive lens without the diffractive lens construction.

In an optical read/write head, the diameter of the light beam should be small in order to reduce the size of the optical read/write head as a whole A smaller diameter light beam requires that the focal length be shortened by increasing the positive power of the objective lens while retaining a high NA (numerical aperture). However, when the radius of curvature is reduced to increase the positive power of the lens, the center thickness of a lens must increase in order to retain a predetermined lens edge thickness. The predetermined lens edge thickness is that thickness required for mounting the lens and, in the case of injection molded plastic lenses, the lens edge thickness required to accommodate an injection molding gate through which molten plastic flows into a cavity to form the lens. A larger center thickness creates the problems of a heavier, more bulky lens.

However, in the present lens, since the diffractive lens function has a positive power, the positive power of the entire lens can be distributed between the refractive lens function and the diffractive lens function. Thus, the radius of curvature of the lens of the embodiment can be larger than that of a refractive lens having the same focal length, and the center thickness can be reduced without reducing the edge thickness.

For example, when the diameter of the light beam is reduced by 0.1 mm, the edge thickness of the conventional refractive lens (without a diffractive lens construction) must be lessened by about 50 μm in order to retain a constant center thickness and a constant NA. On the other hand, when a diffractive lens construction comprising forty ring zones is formed on one lens surface of the refractive lens, the focal length is shortened without changing the macroscopic shape, that is, without increasing the center thickness and without decreasing the edge thickness.

Further, since for higher diffractive orders the focal length is shorter, the second aspect of the embodiment allows a smaller design. In particular, it is desirable to use the first and second order diffractive light beams to allow a shorter focal length while retaining the edge thickness.

In the diffractive lens construction, the ring zones are concentric about the optical axis and generate a plurality of diffractive light orders. That is, the ring zones are not blazed for a single diffractive light order.

In a particular example of the second aspect of the embodiment, the first and second order diffractive light beams are used. In this case, the phase difference $\Delta\phi$ applied for each boundary of the adjacent zones for a predetermined wavelength x satisfies the following condition (1);

$$1.0\lambda < \Delta\phi < 2.0\lambda \quad (1)$$

If the phase shift $\Delta\phi$ is lower than $1.0\lambda$, the light intensity of the zero order diffractive light beam increases, and if the phase shift $\Delta\phi$ is higher than $2.0\lambda$, the light intensity of third order diffractive light beams increases. Also, in either case, the light intensity of the first and second order diffractive light beams decreases and thus, efficiency is reduced.

A preferred example is when the phase shift $\Delta\phi$ is approximately equal to $1.5\lambda$, producing diffractive efficiencies for each of the first and second order diffractive light beams of about 40%, respectively In an optical read/write head, when one of the two diffractive light beams (focal points) is used for reading only and the other is used for reading and writing, it is desirable to distribute the incident light beam between the two diffractive light beans so that the light beam used for reading and writing is more intense than that of the light beam used for only reading. The light beam must be more intense because the energy required for writing is approximately ten times that for reading. Again, in a particular case, if the first focal point is used for reading only, i.e. media such as, for example, compact disks (CD), and the second focal point is used for reading and writing, i.e. media such as, for example, magneto-optic disks (MOD), the phase difference $\Delta\phi$ should be $1.6\lambda,1.7\lambda$ or the like.

For any combination of diffractive light beam orders, when the light beam converging at the first focal point is used for reading only, and the light beam converging at the second focal point is used for both reading and writing, the following condition (2) should be satisfied:

$$0.21 < P1/P2 < 0.76 \quad (2)$$

where

P1 is the light intensity distributed to the first focal point, and

P2 is the light intensity distributed to the second focal point.

The range in condition (2) is determined in accordance with the light intensity required for reading and writing. If the value of P1/P2 is lower than 0.21, the light intensity distributed to the first focal point is lower than the required level for reading. Further, if the light intensity distributed to the first focal point is small as compared with the light beams of other diffractive orders, the data may not be reproduced correctly because of a reduction of the signal to noise (S/N) ratio.

If the value of P1/P2 is greater than 0.76, the light intensity distributed to the second focal point is lower than the required light intensity level for writing by a general semiconductor laser.

There are two ways to increase the light intensity distributed to the second focal point without satisfying the upper limitation of the condition (2). One way is to increase the input current to the semiconductor laser so that the light intensity emitted is larger than the standard level. However, this decreases the life of the semiconductor laser. The other way is to use a semiconductor laser having a larger standard light intensity, but this is pensive and increases the total cost of the optical read/write head.

If the condition (2) is satisfied, the light beams distributed to the two focal points have a good distribution balance, the S/N ratio of the reading signal is maintained, and the light intensity required for writing when using a normal semiconductor laser at the standard light emitting amount is provided.

The surface configuration SAG of the diffractive lens construction is formed using a sagitta equation, described below. A sagitta is defined as the distance between a plane, tangential to the lens surface at the optical axis, and the lens surface, at a height h from the optical axis.

In order to distribute a predetermined amount of the incident light beam to two predetermined diffractive light beams of adjacent orders (i.e. zero order and first order, first order and second order) the surface configuration SAG is defined by the following sagitta equation (3):

$$SAG = \alpha * SAG0 + (1-\alpha) * SAG1 \quad (3)$$

where SAG0 represents a surface configuration blazed to produce a predetermined order diffractive light beam with 100% diffractive efficiency, and SAG1 represents a surface configuration blazed to produce a second predetermined order diffractive light beam with 100% diffractive efficiency.

The coefficient a in the equation (3) must satisfy the following condition (4):

$$0 < \alpha < 1 \quad (4)$$

The surface configuration SAG0 and the surface configuration SAG1 are defined by the following sagitta equations (6) and (7):

$$SAG_0 = \frac{C_0 h^2}{1 + \sqrt{1 - (K_0 + 1)h^2 C_0^2}} + A_4 h^4 + A_6 h^6 + A_8 h^8 + A_{10} h^{10} + N \times G_0 \quad (6)$$

$$SAG_1 = \frac{C_1 h^2}{1 + \sqrt{1 - (K_1 + 1)h^2 C_1^2}} + B_4 h^4 + B_6 h^6 + B_8 h^8 + B_{10} h^{10} + N \times G_1 \quad (7)$$

The values C0 and C1 represent reciprocals of the radius of curvature r0 and r1 on the optical axis respectively as shown in the following equation (8):

$$C_0 = \frac{1}{r_0}, C_1 = \frac{1}{r_1} \quad (8)$$

K0 and K1 denote conic constants and A4(B4), A6(B6), A8(B8) and A10(B10) denote aspherical surface coefficients of a fourth order, a sixth order, an eighth order and a tenth order, respectively. N is a ring zone number for the diffractive lens construction counted from the center as 0 toward the periphery (N=0, 1, 2, ... ). G0 and G1 denote diffractive constants that represent the step size between adjacent ring zones to produce a predetermined order diffractive light beam with 100% diffraction efficiency. In particular, to produce a continuous surface with no steps G0 or G1 equals 0.

As described above, the condition (4) defines the values of α to form a surface configuration SAG to distribute a predetermined light intensity from the different order diffractive light beams to two focal points. The diffractive lens construction is formed by blazing a surface configuration for one order of the two diffractive light beams and superimposing a surface configuration blazed for the other order of the two diffractive light beams according to the desired balance. The ratio of the distributed light intensity, that is, the diffraction efficiency, of the two predetermined orders of diffractive light can be changed by adjusting the value of the coefficient α. This relationship is shown in TABLE 1.

TABLE 1

| α | Diffraction efficiency for predetermined order for SAG0 | Diffraction efficiency for predetermined order for SAG1 |
| --- | --- | --- |
| 0.00 | 0.000 | 1.000 |
| 0.10 | 0.012 | 0.968 |
| 0.20 | 0.055 | 0.875 |
| 0.30 | 0.135 | 0.737 |
| 0.40 | 0.255 | 0.573 |
| 0.50 | 0.405 | 0.405 |
| 0.60 | 0.573 | 0.255 |
| 0.70 | 0.737 | 0.135 |
| 0.80 | 0.875 | 0.055 |
| 0.90 | 0.968 | 0.012 |
| 1.00 | 1.000 | 0.000 |

In the case that the light distributed to the first focal point is used for reading only (i.e. the light beams corresponding to SAG0) and the light distributed to the second focal point is used for writing and reading (i.e. the light beams corresponding to SAG1), the coefficient α must further satisfy the following condition (5):

$$0.31 < \alpha < 0.46 \quad (5).$$

Condition (5) follows from the condition (2) as it applies to the surface configuration SAG. When condition (5) is satisfied, the distributed light intensity of the two diffractive light beams are well balanced for the requirements of reading at the first focal point and writing and reading at the second focal point.

FIG. 2 is a sectional view showing a light beam passing through the lens 10. A light beam incident on the lens surface 11 of the lens 10 is divided into first and second order diffractive light beams by the diffractive lens function, and then these are converged by a combination of the diffractive lens function and the refractive lens function. For example, the first order diffractive light beam L1 (broken lines) forms a first focal point F1 on optical axis Ax, and the second order diffractive light beam L2 (solid lines) forms a second focal point F2 on the optical axis Ax at a point nearer to the lens 10 than the first focal point F1. Since the diffractive lens construction has a positive power, the higher the diffractive order is, the stronger the convergence is, and thus focal points for higher orders are nearer to the lens 10. Accordingly, the focal point for the zero order diffractive light beam, which is formed by the refracting lens function only, is father away from the lens as compared with that of the first focal point F1.

The lens 10 of the embodiment can be used in, for example, an optical read head that reads data recorded on either of a compact disk (CD) and a digital video disk (DVD). In this example, the compact disk is a single sided disk chat is provided with a 1.2 mm thick cover layer on a recorded surface. The digital video disk is a double sided disk that is formed of two single sided disks attached to each other, and provided with a 0.6 mm thick cover layer on each side. The data density of the digital video disk is generally greater than that of the compact disk. Since the data surface of the digital video disk is located nearer to the lens 10 than that of the compact disk when the disks are applied to the same turntable, the first focal point is used for the compact disk and the second focal point is used for the digital video disk.

Also, provided the lens diameter is constant, a lens with a shorter focal length represents a higher numerical aperture NA and forms a smaller light spot. Therefore, it is further desirable to use the second focal point F2 for the higher density digital video disk in order to read the data accurately.

The cover layer of each of the disks is a parallel plate that generates a positive spherical aberration because it is located in the converging light beam. In general, an objective lens is designed so that any spherical aberration is compensated for based on the whole optical system, including both the objective lens and the cover layer. Thus, since the amount of spherical aberration varies in response to the thickness of the cover layer, a negative spherical aberration occurs if an objective lens designed for a compact disk is used for a digital video disk.

In the embodiment, the diffractive lens is designed to have a positive spherical aberration so that spherical aberrations due to cover layers can be reduced to obtain a small light beam spot diameter on the digital video disk. In particular, the positive spherical aberration is formed by applying a power gradient to the diffractive lens construction such that the refractive power becomes smaller with increasing distance from the optical axis.

When compensating for spherical aberration of the cover layers, the compensating effect varies in proportion to the diffractive order and the amount of change n wavelength. That is, for higher diffractive orders, the difference between the spherical aberration for two wavelengths is larger. Accordingly, a lens using first and second order diffractive light beams is preferable to a lens using second and third diffractive light beams in order to prevent an increase in any error due to the spherical aberration.

Four detailed numerical examples of a diffractive bifocal objective lens according to the invention will be described.

EXAMPLE 1

The first example is a diffractive bifocal objective lens that uses zero order and first order diffractive light beams. The diffraction efficiencies are: 40.5 % for the zero order diffractive light beam, 40.5 % for the first order diffractive light beam and 18.9 % for all other order diffractive light beams. The first example lens is suitable for using the zero and first order diffractive light beams for read-only disks. The values of the variables from conditions (1), (2) and (4) are; Δφ=0.5λ, P1/P2=1.0 and α=0.5. Condition (4) is satisfied but conditions (1) and (2) are not satisfied because (respectively) the zero and first order diffractive light beams are used and the light intensity is distributed evenly.

The zero order diffractive light beam converges on a focal point which is positioned on a data surface of a first type of optical disk, such as, for example, a compact disk with a 1.2 mm thick cover layer. The first order diffractive light beam converges on a focal point which is positioned on a data surface of a second type of optical disk, for example, a digital video disk with a 0.6 mm thick cover layer.

The numerical data for the macroscopic configuration of the first example is shown in TABLE 2. In TABLE 2, surface numbers 1 and 2 denote the surfaces of the objective lens (lens surfaces 11 and 12 respectively in FIG. 1), and surface number 3 denotes the top of the cover layer of the optical disk, and surface number 4 denotes the recording surface of the optical disk. The surface denoted as surface number 1 (lens surface 11 in FIG. 1), is formed as the diffractive surface. NA represents the numerical aperture of the objective lens, $\mu$ is the standard wavelength of the incident light beam, f0 is the focal length of the zero order diffractive light beam, f1 is the focal length of the first order diffractive light beam, r is the radius of curvature on the optical axis, d is the distance, along the optical axis, between the surface and the next consecutive surface, n is the refractive index of material at 680 nm and v is the Abbe number. The unit of measure for f0, f1, r and d is mm The distance d for surface number 2 and the distance d for surface number 3 take on different values in accordance with the thickness of the cover layer of the particular type of optical disk.

TABLE 2

| NA = 0.6 | $\lambda$ = 680 nm | f0 = 3.00 mm | f1 = 2.90 mm | |
|---|---|---|---|---|
| Surface number | r | d | n | v |
| 1 | (TABLE 3) | 1.800 | 1.48849 | 57.4 |
| 2 | −4.954 | 1.273/1.504 | | |
| 3 | ∞ | 1.200/0.600 | 1.57834 | 29.9 |
| 4 | ∞ | | | |

The first surface of the lens is formed using equation (3) with $\alpha$ equal to 0.5 The various other coefficients used in equations (6) and (7) to define the fist surface of the first example are shown in TABLE 3.

TABLE 3

| r0 = 1.833 | r1 = 1.748 + 0.00045*N |
|---|---|
| K0 = −0.570 | K1 = −0.570 |
| A4 = 9.132 * $10^{-4}$ | B4 = (−4.456 + 0.0310*N)*$10^{-4}$ |
| A6 = 2.016 * $10^{-4}$ | B6 = (−6.433 + 0.0340*N)*$10^{-4}$ |
| A8 = 2.111 * $10^{-5}$ | B8 = 4.337*10 − 5 |
| A10 = −1.047 * $10^{-5}$ | B10 = (−2.215 + 0.0057*N)*$10^{-5}$ |
| G0 = 0.000 | G1 = −1.392*$10^{-3}$ |

TABLE 4 shows the relationship between the number N of the ring zone and the height h from the optical axis for the first example. The height h represents the location and width of each ring zone when each ring zone is projected to a plane perendicular to the optical axis.

TABLE 4

| N | h | N | h |
|---|---|---|---|
| 0 | 0.000000 ≤ h < 0.299404 | 13 | 1.202425 ≤ h < 1.256080 |
| 1 | 0.299404 ≤ h < 0.398558 | 14 | 1.256080 ≤ h < 1.308880 |
| 2 | 0.398558 ≤ h < 0.516188 | 15 | 1.308880 ≤ h < 1.361070 |
| 3 | 0.516188 ≤ h < 0.612815 | 16 | 1.361070 ≤ h < 1.412885 |
| 4 | 0.612815 ≤ h < 0.697307 | 17 | 1.412885 ≤ h < 1.464567 |
| 5 | 0.697307 ≤ h < 0.773726 | 18 | 1.464567 ≤ h < 1.516373 |
| 6 | 0.773726 ≤ h < 0.844341 | 19 | 1.516373 ≤ h < 1.568591 |

TABLE 4-continued

| N | h | N | h |
|---|---|---|---|
| 7 | 0.844341 ≤ h < 0.910578 | 20 | 1.568591 ≤ h < 1.621560 |
| 5 | 0.910578 ≤ h < 0.973406 | 21 | 1.621560 ≤ h < 1.675697 |
| 9 | 0.973406 ≤ h < 1.033526 | 22 | 1.675697 ≤ h < 1.731546 |
| 10 | 1.033526 ≤ h < 1.091468 | 23 | 1.731546 ≤ h < 1.789840 |
| 11 | 1.091468 ≤ h < 1.147653 | 24 | 1.789840 ≤ h < 1.851629 |
| 12 | 1.147653 ≤ h < 1.202425 | | |

The relationship between the number N arid the height h in the first embodiment is expressed by equation (9). The function "INT(x)" extracts the integer part of a value.

$$N = NT(9.519840h^2 - 0.538313h^4 - 0.0444794h^6 + 0.5) \quad (9).$$

Forming the surface according to equation (9) gives the diffractive lens function a positive power function and a function to compensate for high order spherical aberration.

The second surface of the objective lens (lens surface 12 in FIG. 1.) is a continuous aspherical surface that is rotationally symmetric, and the surface configuration (sagitta equation) of the second surface is given by equation (6) alone. The conic constant, the diffractive constant, and the aspherical surface coefficients are shown in TABLE 5.

TABLE 5

| K0 = 0.000 | G0 = 0.000 |
|---|---|
| A4 = 2.479*$10^{-2}$ | A6 = −5.321*$10^{-3}$ |
| A8 = 8.272*$10^{-4}$ | A10 = −6.068*$10^{-5}$ |

EXAMPLE 2

The second example is also a diffractive bifocal objective lens that uses zero and first order diffractive light beams. However, in this example, the selected diffraction efficiencies are: 25.4% for the zero order diffractive light beam, 57.3% for the first order diffractive light beam and 17.3% for the other order diffractive light beams. The second example lens is suitable for using the zero order diffractive light beam for a read-only disk, such as, for example a compact disk, and using the first order diffractive light beam for a read-write disk such as a magneto-optic disk. The values of the variables for conditions (1), (2) and (4) are; $\Delta\phi = 0.6\lambda$, P1/P2=0.44 and $\alpha$=0.4. Conditions (2), (4) and (5) are satisfied but condition (1) is not satisfied because, in this example, the zero and first order diffractive light beams are used.

The zero order diffractive light beam converges on a focal point which is positioned on a data surface under a 1.2 mm thick cover layer and the first order diffractive light beam converges on a focal point which is positioned on a data surface under a 0.6 mm thick cover layer.

The macroscopic construction is identical to the first example, shown in TABLE 2. The configuration of the diffractive lens construction is different from the first example in that, the first surface of the lens is expressed by the above-mentioned equation (3) using $\alpha$ equal to 0.4. The values of the various coefficients used in the equations (6) and (7) to define the first surface of the second example are identical to those of the first example, shown in TABLE 3. Also, the relationship between the number N of the ring zone and the height h from the optical axis for the second example is identical to the first example and the values are shown in TABLE 4. Further, the second surface of the second example is identical to the first example and the coefficients are shown in TABLE 5.

EXAMPLE 3

The third example is a diffractive bifocal objective lens that uses first and second order diffractive light beams. The diffraction efficiencies are: 40.5% for the first order diffractive light beam, 40.5% for the second order diffractive light beam, and 18.9% for the other order diffractive light beams. The third example lens is suitable for using both the first and second order diffractive light beams for read-only disks. The values of the variables for conditions (1), (2) and (4) are: $\Delta\phi=1.5\lambda$, P1/P2=1.0 and $\alpha=0.5$. The conditions (1) and (4) are satisfied but the condition (2) is not satisfied because of an even distribution of the light intensity.

The first order diffractive light beam converges on a focal point which is positioned on a data surface under a 1.2 mm thick cover layer and the second order diffractive light beam converges on a focal point which is positioned on a data surface under a 0.6 mm thick cover layer.

The numerical data for the macroscopic configuration of the third example is shown in TABLE 6. In TABLE 6, f1 is a focal length of the first order diffractive light beam, f2 is a focal length of the second order diffractive light beam.

TABLE 6

NA = 0.6    $\lambda$ = 680 nm    f1 = 3.01 mm    f2 = 2.92 mm

| Surface number | r | d | n | ν |
|---|---|---|---|---|
| 1 | (TABLE 7) | 1.800 | 1.48849 | 57.4 |
| 2 | -4.717 | 1.300/1.580 | | |
| 3 | ∞ | 1.200/0.600 | 1.57834 | 29.9 |
| 4 | ∞ | | | |

The first surface of the lens is expressed by equation (3) using $\alpha$ equal to 0.5. The values of the various coefficients used in equations (6) and (7) to define the first surface are shown in TABLE 7.

TABLE 7

| | |
|---|---|
| r0 = 1.870 +0.00046*N | r1 = 1.792 + 0.00092*N |
| K0 = -0.660 | K1 = -0.660 |
| A4 = (1.960 + 0.0110*N)*10$^{-4}$ | B4 = (8.800 + 0.2600*N)*10$^{-4}$ |
| A6 = 2.500*10$^{-4}$ | B6 = 1.020*10$^{-4}$ |
| A8 = (1.980 + 0.0430*N)*10$^{-5}$ | B8 = (2.270 + 0.1040*N)*10$^{-5}$ |
| A10 = (-1.398 - 0.0041*N)*10$^{-5}$ | B10 = (-1.745 - 0.0110*N)*10$^{-5}$ |
| G0 = -1.392*10$^{-3}$ | G1 = -2.784*10$^{-3}$ |

TABLE 8 shows the relationship between the number N of the ring zone and the height h from the optical axis for the third example.

TABLE 8

| N | h | N | h |
|---|---|---|---|
| 0 | 0.000000 ≤ h < 0.250877 | 12 | 1.257451 ≤ h < 1.316438 |
| 1 | 0.250877 ≤ h < 0.436215 | 13 | 1.316438 ≤ h < 1.373814 |
| 2 | 0.436215 ≤ h < 0.565354 | 14 | 1.373814 ≤ h < 1.428804 |
| 3 | 0.565354 ≤ h < 0.671575 | 15 | 1.429804 ≤ h < 1.484606 |
| 4 | 0.671575 ≤ h < 0.764522 | 16 | 1.484606 ≤ h < 1.538396 |
| 5 | 0.764522 ≤ h < 0.848595 | 17 | 1.538396 ≤ h < 1.591344 |
| 6 | 0.848595 ≤ h < 0.926239 | 18 | 1.591344 ≤ h < 1.643618 |
| 7 | 0.926239 ≤ h < 0.998973 | 19 | 1.643618 ≤ h < 1.695395 |
| 8 | 0.998973 ≤ h < 1.067823 | 20 | 1.695395 ≤ h < 1.746873 |
| 9 | 1.067823 ≤ h < 1.133514 | 21 | 1.746873 ≤ h < 1.798286 |
| 10 | 1.133514 ≤ h < 1.196585 | 22 | 1.798286 ≤ h < 1.849923 |
| 11 | 1.196585 ≤ h < 1.257451 | | |

The second surface of the objective lens is a continuous aspherical surface that is rotationally symmetric, and the surface configuration (sagitta equation) for the second surface is given by the equation (6) alone. The conic constant, diffractive constant, and aspherical surface coefficients are shown in TABLE 9.

TABLE 9

| | |
|---|---|
| K0 = 0.000 | G0 = 0.000 |
| A4 = 2.435*10$^{-2}$ | A6 = -5.386*10$^{-3}$ |
| A8 = 8.370*10$^{-4}$ | A10 = -6.070*10$^{-5}$ |

FOURTH EXAMPLE

The fourth example is a diffractive bifocal objective lens that uses first and second order diffractive light beams. The diffraction efficiencies are; 25.4% for the first order diffractive light beam, 57.3% for the second order diffractive light beam, and 17.3% for the other order diffractive light beams. The fourth example lens is suitable for using the first order diffractive light beam for a readonly disk such as a compact disk and using the second order diffractive light beam for a read-write disk such as a magneto-optic disk. The values of the variables for the conditions (1), (2) and (4) are: $\Delta\phi=1.6\lambda$, P1/P2=0.44, and $\alpha=0.4$. The conditions (1), (2), (4) and (5) are satisfied.

The first order diffractive light beam converges on a focal point which is positioned on a data surface under a 1.2 mm thick cover layer and the second order diffractive light beam converges on a focal point which is positioned on a data surface under a 0.6 mm thick cover layer.

The macroscopic construction is identical to the third example, shown in TABLE 6. The configuration of the diffractive lens construction is different from the third example in that, the first surface of the lens is expressed by the above-mentioned equation (3) using a equal to 0.4. The values of the various coefficients used in equations (6) and (7) to define the first surface of the fourth example are identical to that of the third example, shown in TABLE 7. The relationship between the number N of the ring zone and the height h from the optical axis for the fourth example is identical to the third example and is shown in TABLE 8. The second surface of the fourth example is also identical to the third example and the values of the coefficients are shown in TABLE 9.

Also, with regard to example 4, the diffraction efficiency of the two diffractive orders, and therefore, the distribution balance between the two diffractive orders (i. e. P1/P2) can be changed by varying the coefficient $\alpha$, for example, giving the values shown in TABLE 10.

TABLE 10

| $\alpha$ | $\Delta\phi$ | Fist order | Second order | P1/P2 |
|---|---|---|---|---|
| 0.320 | 1.680 | 15.6% | 70.5% | 0.22 |
| 0.460 | 1.540 | 34.2% | 47.1% | 0.73 |

Although the structure of a diffractive multi-focal objective lens is described herein with respect to the preferred embodiments, many modifications and changes can be made without departing from the spirit and scope of the invention.

As an example, if the wavelength of the incident light beam varies by 1 nm, the posit-on of the focal points on the optical axis change by a specified amount for each of the above mentioned examples. The position of the focal point of the zero order diffractive light beam changes +0.12 $\mu$m for a 1.2 mm thick cover layer, the position of the focal point of the first order diffractive light beam changes +0.05 μm for a 0.6 mm thick cover layer, the position of the focal point of the first order diffractive light beam changes +0.03 μm for a 1.2 mm thick cover layer, and the position of the focal point of the second order diffractive light beam changes −0.04 μm for a 0.6 mm thick cover layer. A plus sign indicates a change away from the lens and a minus sign indicates a change toward the lens.

In a situation in which the numerical aperture NA does not have to be the same for each of the two light beams, i.e., when the required diameters of the light beams are different for different diffraction orders, the diffractive lens construction can be designed so that only the peripheral area is blazed for the diffraction order light beam that is to have a larger diameter. Depending on the detail of this diffractive lens construction, the diffraction efficiency of the larger diameter light bear, can be set at approximately 100%.

In particular, when the first and second order diffractive light beams are used, and when the numerical aperture of the first order diffractive light beam is required to be larger than that of the second order diffractive light beam, the center portion of the lens through which both of the light beams pass must be designed to produce the first and second order diffractive light beans, and the peripheral portion can be designed to produce only the first order diffractive light beam.

The present disclosure relates to subject matter contained in Japanese Patent Application No. HEI 7-242466, filed on Aug. 28, 1995, which is expressly incorporated herein by reference in its entirety.

What is claimed is:

1. A diffractive multi-focal objective lens, comprising:
    means for refracting an incident light beam to converge said light beam, said refracting means comprising a single piece positive lens; and
    means for diffracting said incident light beam to divide said incident light beam into a plurality of diffractive light beams,
    said diffracting means comprising a microscopic diffractive lens construction formed on a lens surface of said single piece positive lens;
    whereby said incident light beam is divided into a plurality of diffractive light beams that converge at a plurality of focal points on an optical axis of said lens,
    wherein a predetermined light intensity amount of said incident light beam is distributed to two of said plurality of diffractive light beams which converge, respectively, at two of said plurality of focal points, such that a focal point of a higher order diffractive light beam is closer to said lens than a focal point of a lower order diffractive light beam, a power of said diffractive lens construction being smaller for greater distances from said optical axis towards a periphery of said lens, a variation of said power of said diffractive lens construction compensating for a spherical aberration of said refracting means.

2. The diffractive multi-focal objective lens according to claim 1, wherein said two of said plurality of focal points are formed by a zero order diffractive light beam and a first order diffractive light beam respectively.

3. The diffractive multi-focal objective lens according to claim 1, wherein said two of said plurality of focal points are formed by a first order diffractive light beam and a second order diffractive light bean respectively.

4. The diffractive multi-focal objective lens of claim 3, wherein said diffractive lens construction comprises concentric ring zones with centers on said optical axis, so that a phase difference Δϕ applied at each boundary of adjacent zones for a predetermined wavelength λ satisfies the following condition:

$$1.0\lambda < \Delta\phi < 2.0\lambda.$$

5. A diffractive multi-focal objective lens, comprising:
    means for refracting an incident light beam to converge said light beam,
    said refracting means comprising a single piece positive lens; and
    means for diffracting said incident light beam to divide said incident light beam into a plurality of diffractive light beams,
    said diffracting means comprising a microscopic diffractive lens construction formed on a lens surface of said single piece positive lens;
    whereby said incident light beam is divided into a plurality of diffractive light beams that converge at a plurality of focal points on an optical axis of said lens,
    wherein a predetermined light intensity amount of said incident light beam is distributed to two of said plurality of diffractive light beams which converge, respectively, at two of said plurality of focal points, said two diffractive light beams having a diffractive order at least equal to a first order, a variation of a power of said diffractive lens construction compensating for a spherical aberration of said refracting means.

6. The diffractive multi-focal objective lens according to claim 5, wherein said two diffractive light beams comprise a first order diffractive light beam and a second order diffractive light beam.

7. The diffractive multi-focal objective lens according to claim 6, wherein said diffractive lens construction comprises concentric ring zones with centers on said optical axis, so that a phase difference Δϕ being applied at each boundary of adjacent zones for a predetermined wavelength λ satisfies the following condition:

$$1.0\lambda < \Delta\phi < 2.0\lambda.$$

8. A diffractive multi-focal objective lens, comprising:
    means for refracting an incident light beam to converge said light beam,
    said refracting means comprising a single piece positive lens; and
    means for diffracting said incident light beam to divide said incident light beam into a plurality of diffractive light beams,
    said diffracting means comprising a microscopic diffractive lens construction formed on a lens surface of said single piece positive lens;
    whereby said diffractive multi-focal objective lens divides said incident light beam into a plurality of diffractive light beams that converge at a plurality of focal points on an optical axis of said lens, and
    wherein a predetermined light intensity amount of said incident light beam is distributed to a first focal point and a second focal point, selected from said plurality of focal points, by defining a surface configuration SAG of said diffractive lens constructed by the following sagitta equation:

$$SAG = \alpha * SAG0 + (1-\alpha) * SAG1, \text{ wherein}$$

a coefficient a satisfies the following condition:

$0 < \alpha < 1$, where SAG0 represents a surface configuration blazed to produce a first predetermined order diffractive light beam with 100% diffractive efficiency, configured such that said diffractive multi-focal objective lens converges said first predetermined order diffractive light beam at said first focal point, and SAG1 represents a surface configuration blazed to produce a second predetermined order diffractive light beam configured such that said diffractive multi-focal objective lens converges said second predetermined order diffractive light beam with 100% diffractive efficiency at said second focal point, said light distributed to said first focal point being used only for reading optical data, said light distributed to said second focal point being used for writing and reading of optical data, said coefficient $\alpha$ satisfying the following condition:

$0.31 \leq \alpha \leq 0.46$.

* * * * *

UNITED STATES PATENT AND TRADEMARK OFFICE
CERTIFICATE OF CORRECTION

PATENT NO. : 5,838,496
DATED : November 17, 1998
INVENTOR(S) : T. ISHIKAWA et al.

It is certified that error appears in the above-identified patent and that said Letters Patent is hereby corrected as shown below:

At column 14, line 67 (claim 8, line 23) of the printed patent, "coefficient a" should be —coefficient $\alpha$—.

Signed and Sealed this

Twenty-fifth Day of April, 2000

Attest:

Q. TODD DICKINSON

Attesting Officer

Director of Patents and Trademarks